(12) United States Patent
Tanaka et al.

(10) Patent No.: US 7,271,998 B2
(45) Date of Patent: Sep. 18, 2007

(54) INFORMATION PROCESSOR

(75) Inventors: Hideki Tanaka, Kawasaki (JP);
Hideyuki Motoyama, Kawasaki (JP);
Hiroshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 2 days.

(21) Appl. No.: 11/082,892

(22) Filed: Mar. 18, 2005

(65) Prior Publication Data

US 2005/0162825 A1 Jul. 28, 2005

Related U.S. Application Data

(63) Continuation of application No. PCT/JP03/00387, filed on Jan. 17, 2003.

(51) Int. Cl.
*G06F 1/16* (2006.01)
*G06F 13/00* (2006.01)

(52) U.S. Cl. ............... 361/683; 361/680; 361/685; 361/725; 361/727; 710/303

(58) Field of Classification Search ........... 361/683, 361/680, 685, 686, 725, 727
See application file for complete search history.

(56) References Cited

U.S. PATENT DOCUMENTS

| | | | |
|---|---|---|---|
| 5,153,817 A * | 10/1992 | Hosoi et al. ............. | 361/685 |
| 5,689,400 A | 11/1997 | Ohgami et al. | |
| 6,510,048 B2 * | 1/2003 | Rubenson et al. ......... | 361/680 |
| 6,771,493 B2 * | 8/2004 | Chen ...................... | 361/680 |
| 6,894,893 B2 * | 5/2005 | Hidesawa ................ | 361/683 |
| 2002/0044412 A1 * | 4/2002 | Kambayashi et al. ..... | 361/683 |
| 2003/0053290 A1 * | 3/2003 | Tanaka et al. ........... | 361/683 |

FOREIGN PATENT DOCUMENTS

| | | |
|---|---|---|
| JP | 7-219682 | 8/1995 |
| JP | 7-325643 | 12/1995 |
| JP | 10-116133 | 5/1998 |
| JP | 2000-112565 | 4/2000 |
| JP | 2000-172373 | 6/2000 |
| JP | 2000-293265 | 10/2000 |
| JP | 2001-67144 | 3/2001 |
| JP | 2001-125680 | 5/2001 |

OTHER PUBLICATIONS

"Cabinet Hing Types—The Hardware Hut" http://www.thehardwarehut.com/cabinet_hinge_types.php 3pages.*

* cited by examiner

*Primary Examiner*—Jayprakash Gandhi
*Assistant Examiner*—Zachary M Pape
(74) *Attorney, Agent, or Firm*—Westerman, Hattori, Daniels & Adrian, LLP.

(57) ABSTRACT

An information processor such that interfaces mounted in the side faces of the main body of the information processor can be effectively used, and the connectability of an expanded device is excellent. The information process comprises a main body having a built-in function unit in its case and an interface unit provided in a side face of the main body. In the side face of the main body in which the interface unit is provided has an interface attachment part to which the interface unit is attached and an expanded device receiving part capable of receiving at least one expanded device. The interface unit has a one-piece appearance integrated with the case of the main body when the interface unit is attached to the interface attachment part. When an expended device is received in the expanded device receiving part, the expanded device is held between the interface unit and the side face of the main body.

3 Claims, 6 Drawing Sheets

INFORMATION PROCESSOR

This is a continuation of International Application PCT/JP2003/000387, with an an international filing date of Jan. 17, 2003.

BACKGROUND OF THE INVENTION

1. Field of the Invention

The present invention relates to an information processor, and more particularly relates to an information processor comprising a main unit having a main function unit built into a case, and an interface unit provided to a side face of the main unit.

2. Background Information

With information processors such as laptop computers, there is a type in which various interfaces, such as auxiliary liquid crystal display panels that serve as status displays, or control buttons such as one-touch buttons, are provided on a side face corresponding to the front of the case that houses the main function unit. Also, various interfaces such as USB terminals, IEEE1394 terminals, LAN cable terminals, card slots, and battery compartments are sometimes provided to a side face located to the rear or the side of the case.

Also, an expansion device receiving component is sometimes provided to a side face of the case in order to install an auxiliary battery, large-capacity battery, flexible disk drive (FDD), hard disk drive (HDD), or other expansion device.

Further, there have been proposals for information processors equipped with an interface unit called a port replicator, with which a USB terminal, IEEE1394 terminal, LAN cable terminal, or other connector can be connected to the main unit with a connector cord and can be separated from the main unit.

SUMMARY OF THE INVENTION

The information processor according to a first aspect of the present invention comprises a main unit having a main function unit built into a case, and an interface unit provided to a side face of the main unit, wherein the side of the main unit where the interface unit is attached comprises an interface attachment component to which the interface unit can be attached and an expansion device receiving component to which at least one expansion device can be attached, and the interface unit is designed to appear to be integrated with the case of the main unit when attached to the interface attachment component of the main unit, and an expansion device is sandwiched between the interface unit and the side face of the main unit when the expanded device is received in the expansion device receiving component.

The result of this constitution is that when the expansion device is not being used, the interface unit is attached to the interface attachment component of the main unit, which gives the case an integrated appearance and makes it more compact. When an expansion device is attached to the expansion device receiving component, it is sandwiched between and supported by the main unit and the interface unit, making it very easy to connect an expansion device and allowing everything to be carried without alteration.

The information processor according to a second aspect of the present invention is the information processor according to the first aspect, further comprising a movement mechanism for moving the interface unit from the side face of the main unit while maintaining the state of electrical connection with the main unit, and producing a gap large enough for the expansion device to be attached to the expansion device receiving component of the main unit.

In this case, the interface unit is moved by the movement mechanism, which facilitates the attachment of an expansion device.

The information processor according to a third aspect of the present invention is the information processor according to the second aspect, wherein the movement mechanism includes a sliding mechanism for sliding the interface unit sideways from the interface attachment component of the main unit.

In this case, an expansion device can be attached to the expansion device receiving component merely by sliding the interface unit outward from the interface attachment component.

The information processor according to a fourth aspect of the present invention is the information processor according to the second aspect, wherein the movement mechanism includes an upward movement mechanism for retracting the interface unit to above the side face of the expansion device receiving component.

In this case, attachment of an expansion device is further facilitated by retracting the interface unit to above the side face of the expansion device receiving component.

The information processor according to a fifth aspect of the present invention is the information processor according to a first aspect, wherein the interface unit can be attached to or detached from an interface receiving component provided to the side face of the expansion device and the interface attachment component of the main unit.

In this case, when the expansion device is not being used, the interface unit is attached to the interface attachment component of the main unit, which gives the case an integrated appearance, and when the expansion device is being used, the expansion device is attached to the expansion device receiving component of the main unit and the interface unit is attached to the interface receiving component of the expansion device, allowing both the expansion device and the interface unit to be integrally attached to the main unit.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION

Figure 1:
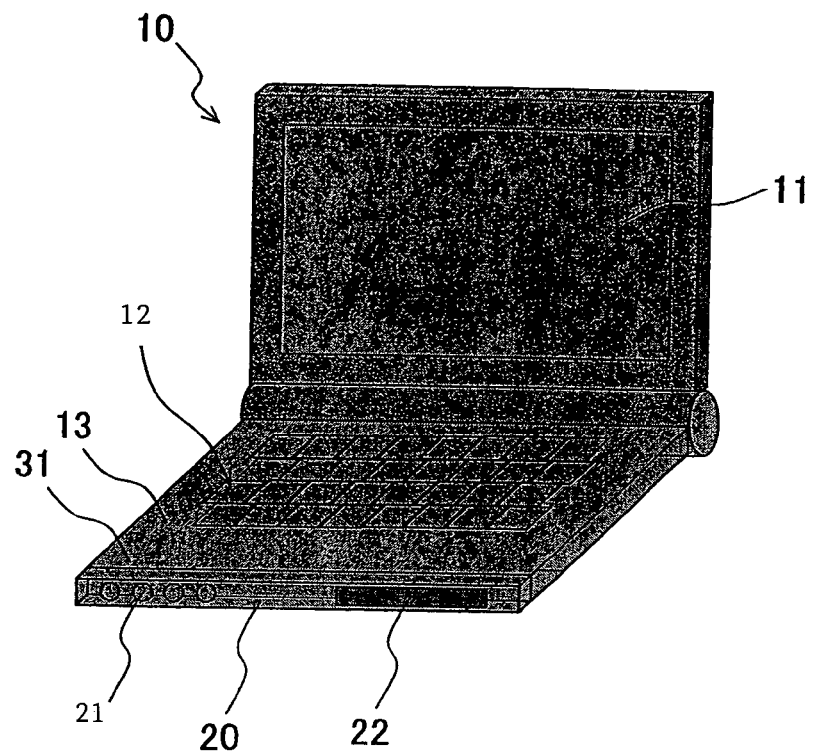
FIG. 1 is an oblique view illustrating a first embodiment of the present invention.

When one-touch buttons, status displays, or the like are installed at the front of the case as mentioned above, a problem is that it is impossible to provide an expansion device receiving component for installing an auxiliary battery, large-capacity battery, flexible disk drive (FDD), hard disk drive (HDD), or other expansion device at the front of the main unit.

Also, when an expansion device receiving component for installing an expansion device is provided to a side face at the front of the case, there are limitations on the location on the case where the one-touch buttons, status displays, or various other such interfaces can be installed. In particular, when a large-capacity battery is installed on the front side of a case, it becomes difficult to install these various interfaces on the side face located at the front of the case, but locating these on other side faces poses a problem in terms of ease of use.

When an expansion device receiving component is provided to a side face of the case, and when all or part of an expansion device is held inside the case, there needs to be enough room to hold the expansion device inside the case, and this greatly restricts the surface area of the board on which the components are mounted in the main unit, as well as the structure of the other mounted components.

If the function of a port replicator connected by connector cord to the main unit is to be used at all times, then this port replicator always has to be carried around along with the main unit. Separating the interface unit of a port replicator is advantageous in terms of compact size, particularly with compact portable information processors, but a problem is that taking advantage of the function of the interface unit requires that the port replicator also be carried around. It is an object of the present invention to provide an information processor with which various kinds of interfaces that are installed at a side face of the main unit can be effectively utilized, and to which it is very easy to connect expansion devices.

FIRST EMBODIMENT

A first embodiment of the present invention will be described through reference to FIGS. 1 to 7.

The information processor in the first embodiment is a notebook type of personal computer, and comprises a main unit 10 and an interface unit 20 provided to a side face located at the front of the main unit 10.

The main unit 10 comprises a keyboard 12 on which a plurality of keys are arranged, a pointing device (not shown) consisting of a touch panel, track ball, or the like, and so forth provided on the top side of a case 13, and a display component 11 consisting of a liquid crystal display panel or the like that is hinged at the rear portion so as to be able to open and close with respect to the case 13. Built into the case 13 are a motherboard (not shown) on which are mounted a CPU, a main memory, and so forth, a battery (not shown), and so forth. The side face located at the front of the case 13 comprises an interface attachment component that allows the attachment of the interface unit 20, and an expansion device receiving component for receiving an expansion device.

The interface unit 20 comprises control buttons 21 consisting of one-touch buttons or the like, and various interface function components such as an auxiliary liquid crystal display component 22 (such as a status display), provided on the side face located at the front. The interface unit 20 is attached to the interface attachment component of the main unit 10, and is designed to appear integrated with the case 13. The interface unit 20 is provided with a movement mechanism that moves the interface unit 20 forward from the main unit 10 while maintaining the state of electrical connection with the main unit 10, thereby producing a gap large enough for the expansion device to be attached to the expansion device receiving component of the main unit.

An example of the movement mechanism for moving the interface unit 20 will now be described through reference to the bottom view shown in FIG. 3.

Figure 3:
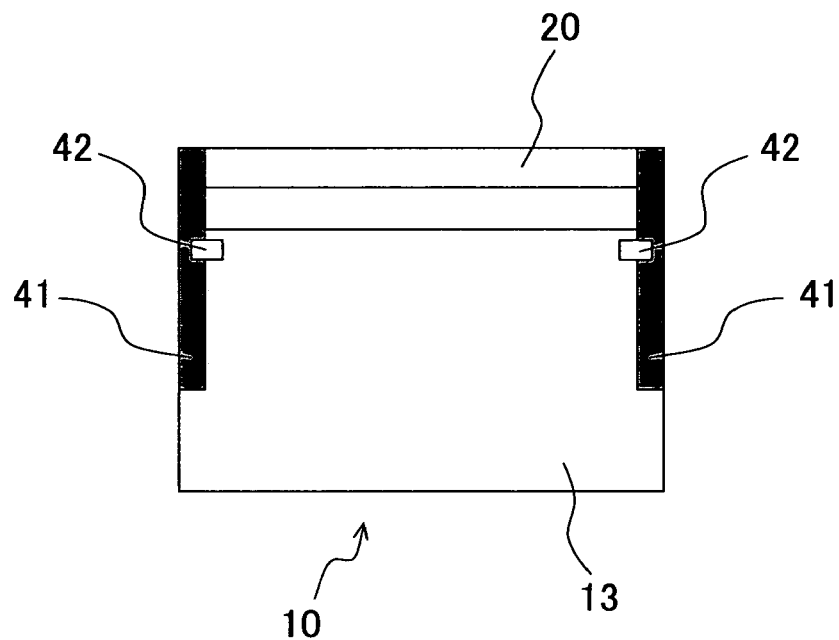
FIG. 3 is a bottom view of the main unit.

As shown in FIG. 3, the interface unit 20 is fixed on the underside of the main unit 10, and guide members 41 that are supported slidably with respect to the main unit 10 are provided apart from each other on the left and right sides. These guide members 41 serve to slide the interface unit 20 forward and backward with respect to the main unit 10, and have locking mechanisms 42 for locking the interface unit 20 in a suitable position.

Figure 4:
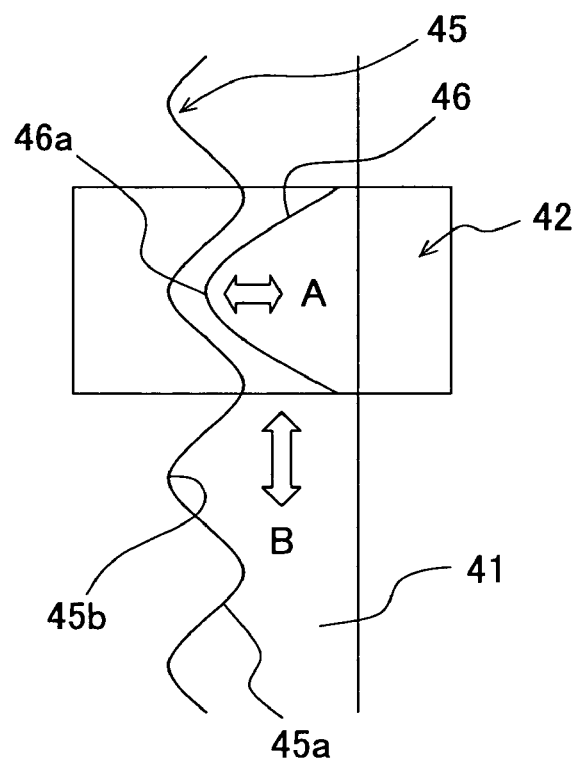
FIG. 4 is a diagram of a locking mechanism.

FIG. 4 shows an example of a locking mechanism 42.

A sliding surface 45 is formed in an undulating shape on the main unit 10 side, and a spring or other elastic member 46 whose distal end strikes the sliding surface 45 is provided to the guide member 41. When the guide member 41 moves in the direction of the arrow B, the distal end 46a of the elastic member 46 pushes against the convex components 45a of the sliding surface 45 and contracts against its own biasing force, then expands under its biasing force at the concave components 45b of the sliding surface 45. As a result, when the interface unit 20 is slid against the biasing force of the elastic member 46, the elastic member 46 moves along with the guide member 41 while repeatedly expanding and contracting in the direction of the arrow A. When the force at which the interface unit 20 is slid is decreased, the biasing force of the elastic member 46 is weakest when the distal end 46a of the elastic member 46 is located in the concave components 45b of the sliding surface 45, so the guide member 41 will be locked in this position.

With a constitution such as this, even when expansion devices of different size are attached, they can be sandwiched between and supported by the interface unit 20 and the main unit 10.

Figure 5:
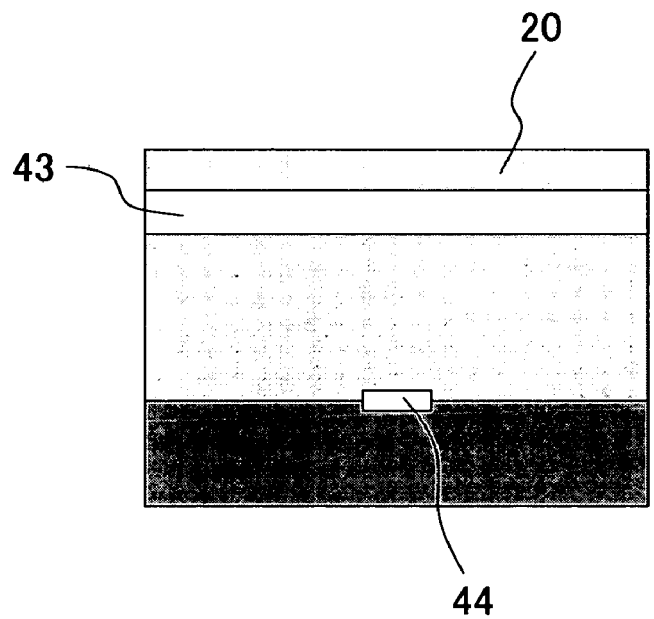
FIG. 5 is a bottom view of the main unit, illustrating another example of a guide member.

The movement mechanism that moves the interface unit 20 can also be configured as shown in FIG. 5.

In FIG. 5, a guide member 43 that is fixed to the interface unit 20 and is slidably supported with respect to the main unit 10 is provided over the entire underside of the main unit 10. This guide member 43 similarly slides the interface unit 20 forward and backward with respect to the main unit 10, and a locking mechanism 44 for locking the interface unit 20 in a suitable position can be provided to the guide member 43. This locking mechanism 44 can have the same undulating sliding surface configuration as the elastic member in FIG. 4, or recesses can be provided at suitable locations in the underside of the main unit 10, and a ball that is spring-biased toward these recesses can be provided to the guide member 43.

The interface unit 20 that is movable with respect to the main unit 10 by utilizing a movement mechanism as described above can be equipped with a connection maintenance unit for maintaining electrical connection with the main unit 10. An example of this connection maintenance unit will be described through reference to FIG. 6.

Figure 6:
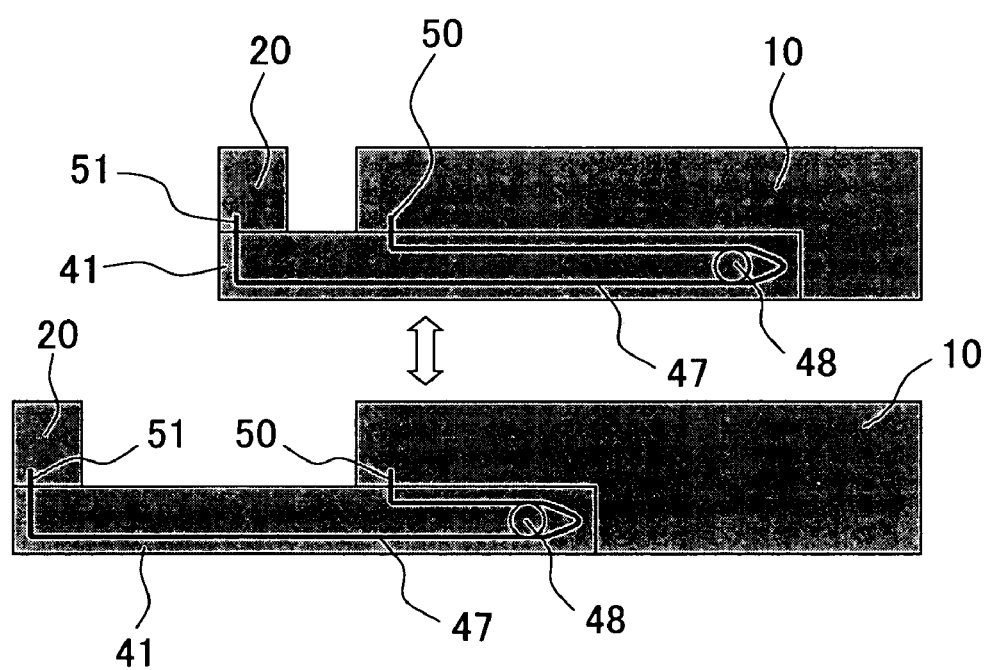
FIG. 6 is a diagram of a connection maintenance mechanism.

As shown in FIG. 6, a wiring member 47 is constituted by a flexible cable, and is disposed along the guide member 41 or inside the guide member 41. The wiring member 47 is connected at one end 50 to the main unit 10 and at the other end 51 to the interface unit 20. The middle part of the wiring member 47 maintains a specific spacing between the main unit 10 side and the interface unit 20 side, and also engages with a roller 48 so as to allow smooth movement. The result of this constitution is that the interface unit 20 can be moved relative to the main unit 10 while maintaining the electrical connection between the main unit 10 and the interface unit 20.

The connection maintenance unit can also comprise electrodes capable of maintaining a state of electrical connection by sliding against each other, disposed on the main unit 10 and the guide member 41.

Figure 2:
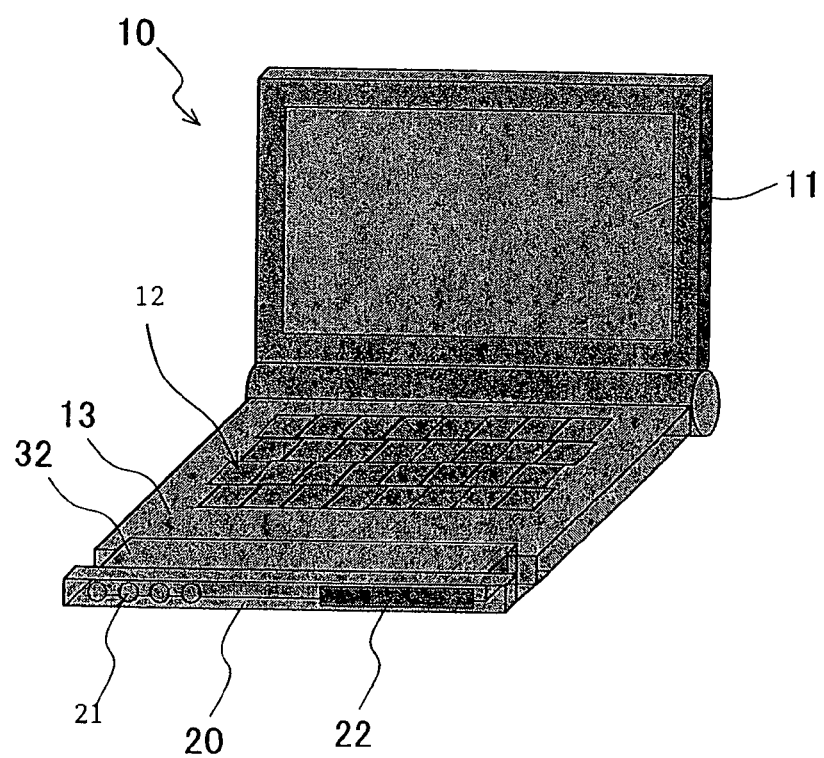
FIG. 2 is an oblique view illustrating a first embodiment of the present invention.

The result of this constitution is that it accommodates both the case shown in FIG. 1, in which a battery 31 of standard size is disposed inside the interface unit 20, and the case shown in FIG. 2, in which a large-capacity battery 32 is supported by being sandwiched between the interface unit 20 and the main unit 10.

Figure 7:
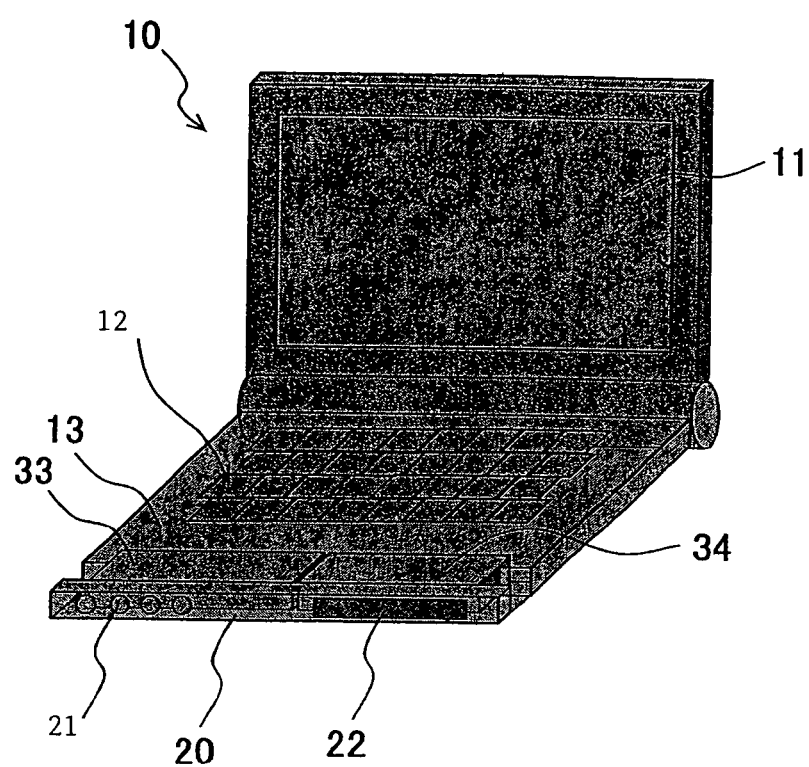
FIG. 7 is an oblique view illustrating an example in which a plurality of expansion devices are installed.

Also, as shown in FIG. 7, the constitution can be such that a plurality of expansion devices, such as a first expansion device 33 and a second expansion device 34, are disposed and supported between the main unit 10 and the interface unit 20 at the same time.

The standard battery 31 and large-capacity battery 32 were used as examples in this first embodiment, but it is also possible for the expansion device receiving component of the main unit 10 to have a bay construction, and for a FDD, CD-ROM drive, HDD, PCI card, or the like to be installed as an expansion device.

It is also possible to achieve electrical connection between the expansion device and the main unit 10 via a connector or the like provided to the expansion device receiving component of the main unit 10, and it is possible to provide a connector or the like to the back side of the interface unit 20 and achieve electrical connection via the interface unit 20.

SECOND EMBODIMENT

Figure 8:
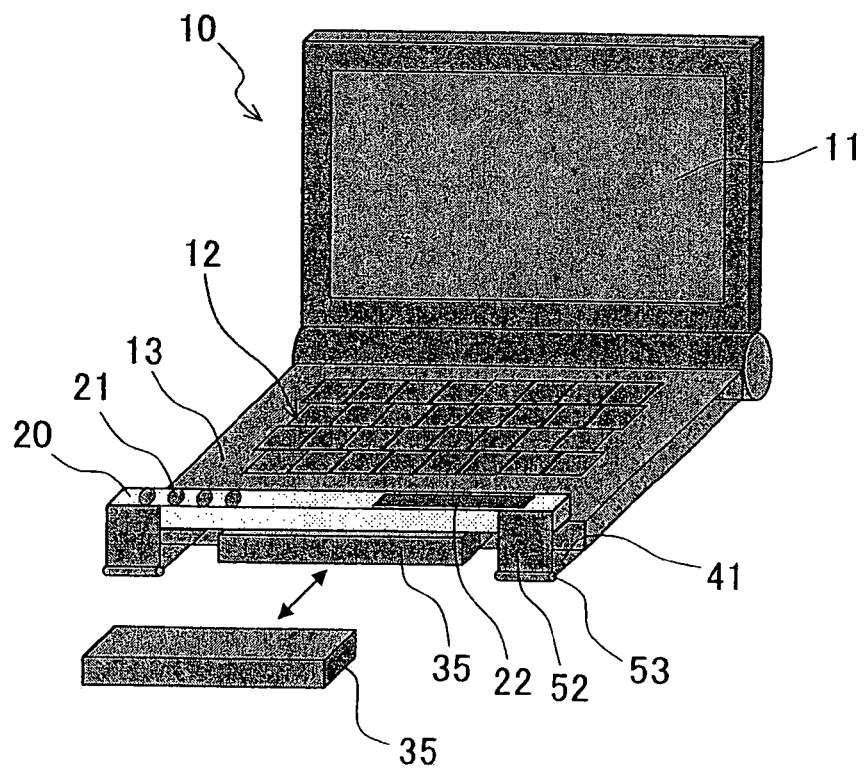
FIG. 8 is an oblique view illustrating a second embodiment.

FIG. 8 shows the information processor pertaining to a second embodiment of the present invention.

The information processor shown in FIG. 8 is a notebook type of personal computer just as in the first embodiment, and comprises a main unit 10 and an interface unit 20 provided to a side face located at the front of the main unit 10.

The main unit 10 comprises a keyboard 12 on which a plurality of keys are arranged, a pointing device (not shown) consisting of a touch panel, track ball, or the like, and so forth provided on the top side of a case 13, and a display component 11 consisting of a liquid crystal display panel or the like that is hinged at the rear portion so as to be able to open and close with respect to the case 13. Built into the case 13 are a motherboard (not shown) on which are mounted a CPU, a main memory, and so forth, a battery (not shown), and so forth. The side face located at the front of the case 13 comprises an interface attachment component that allows the attachment of the interface unit 20, and an expansion device receiving component for receiving an expansion device.

The interface unit 20 comprises control buttons 21 consisting of one-touch buttons or the like, and various interface function components such as an auxiliary liquid crystal display component 22 (such as a status display), provided on the side face located at the front. The interface unit 20 is attached to the interface attachment component of the main unit 10, and is designed to appear integrated with the case 13. The interface unit 20 is provided with a movement mechanism that moves the interface unit 20 forward from the main unit 10 while maintaining the state of electrical connection with the main unit 10, thereby producing a gap large enough for the expansion device to be attached to the expansion device receiving component of the main unit.

Just as in FIG. 3, guide members 41 that are supported slidably with respect to the main unit 10 are provided apart from each other on the left and right sides. These guide members 41 are provided with locking mechanisms 42 for locking the interface unit 20 in a suitable position.

A hinge 52 that is rotatable with respect to the guide member 41 is attached via a support shaft 53 at the distal end of each guide member 41. The interface unit 20 is fixed to the hinges 52, and can be retracted upward by rotating it along with the hinges 52 around the support shafts 53.

When an expansion device 35 is installed or removed from the expansion device receiving component of the main unit 10, the interface unit 20 is pulled out forward and retracted upward via the hinges 52, which facilitates installation and removal of the expansion device 35.

THIRD EMBODIMENT

Figure 9:
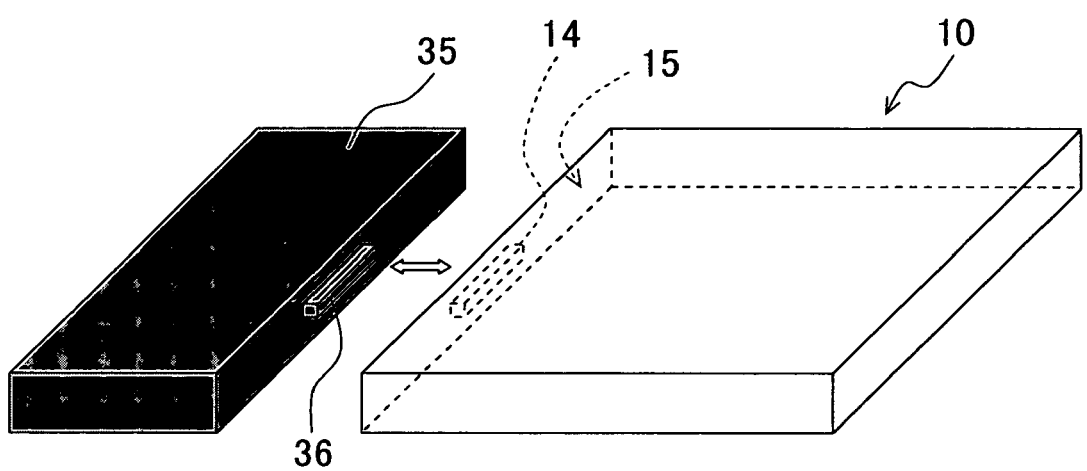
FIG. 9 is an oblique view illustrating a third embodiment.

FIG. 9 shows the information processor pertaining to a third embodiment of the present invention.

With the information processor in this third embodiment, the front side 15 of the main unit 10 serves as both the interface attachment component and the expansion device receiving component, and the interface unit 20 is detachably attached to the main unit 10.

An expansion device receiving connector 14 provided to the front side 15 is exposed when the interface unit 20 is separated from the main unit 10. In this state, a connector 36 for an expansion device 35 is connected to the expansion device receiving connector 14 to achieve electrical connection.

Figure 10:
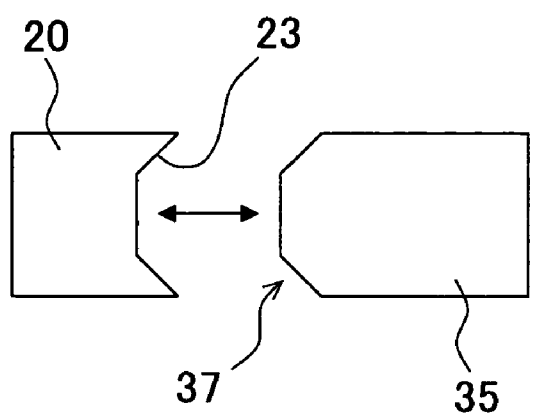
FIG. 10 is a diagram illustrating the engagement relationship between the interface unit and the expansion device.

The side face that is on the opposite side from the side where the connector 36 for the expansion device 35 is formed can be a protruding joint 37 that engages with an engagement recess 23 provided to the interface unit 20 as shown in FIG. 10. In this case, electrical connection between the expansion device 35 and the main unit 10 is achieved by unit of the connector 36 and the expansion device receiving connector 14, and the expansion device 35 can be securely supported between the main unit 10 and the interface unit 20 by engaging the protruding joint 37 of the expansion device 35 in the engagement recess 23 of the interface unit 20.

Figure 11:
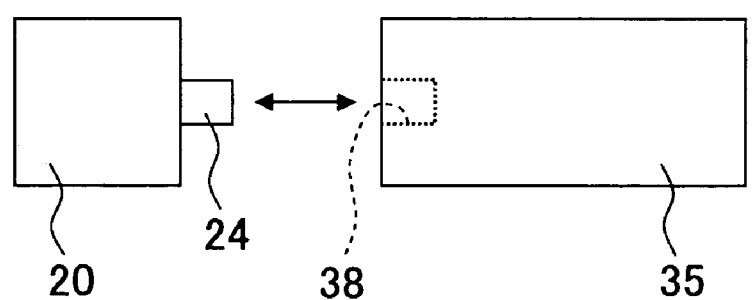
FIG. 11 is a diagram illustrating the engagement relationship between the interface unit and the expansion device.

Alternatively, as shown in FIG. 11, the expansion device 35 can be provided with a connector receiver 38 that fits a connector 24 of the interface unit 20. In this case, after being separated from the main unit 10, the interface unit 20 can be again coupled with the main unit 10 via the expansion device 35 by connection between the connector 24 and a connector receiver 38, and a variety of electrical connections can be made through various connectors.

OTHER EMBODIMENTS

Examples of possible expansion devices include ten-keys, keyboards, pointing devices, and other such input devices, HDD, FDD, CD-ROM drives, MO drives, memory card slots, and other such storage medium input-output devices, liquid crystal panels and other such display devices, AC adapters, portable information terminals, and so forth.

It is also possible to install a palm rest as an expansion device. In this case, if a palm rest equipped with internal space is used as an expansion device, this internal space can be utilized to hold information processor accessories and so forth.

In the above embodiments, the interface unit 20 can comprise a USB terminal, IEEE1394 terminal, LAN cable terminal, or other types of port.

With the present invention, an interface unit equipped with various interface functions can be efficiently disposed in its mounting to a main unit, and expansion devices can be attached and detached more easily, which makes the information processor more expandable.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. An information processor comprising:
   a main unit having a main function unit built into a case, and an interface unit provided to a side face of the main unit, wherein the side face of the main unit where the interface unit is attached comprises an interface attachment component to which the interface unit can be attached and an expansion device receiving component to which at least one expansion device can be attached, and
   a movement mechanism for moving the interface unit from the side face of the main unit while maintaining a state of electrical connection with the main unit, and producing a gap large enough for the at least one expansion device to be attached to the expansion device receiving component of the main unit, said state of electrical connection being maintained by a wiring member embedded in said movement mechanism,
   wherein the interface unit is designed to appear to be integrated with the case of the main unit when attached to the interface attachment component of the main unit, and the at least one expansion device is sandwiched between the interface unit and the side face of the main unit when the at least one expansion device is received in the expansion device receiving component, and
   wherein the interface unit can be attached to or detached from an interface receiving component provided to the side face of the expansion device and the interface attachment component of the main unit.

2. The information processor according to claim 1, wherein the movement mechanism includes a sliding mechanism for sliding the interface unit sideways from the interface attachment component of the main unit.

3. The information processor according to claim 1, wherein the movement mechanism includes an upward movement mechanism for retracting the interface unit to above the side face of the expansion device receiving component.

* * * * *